Figure 1:
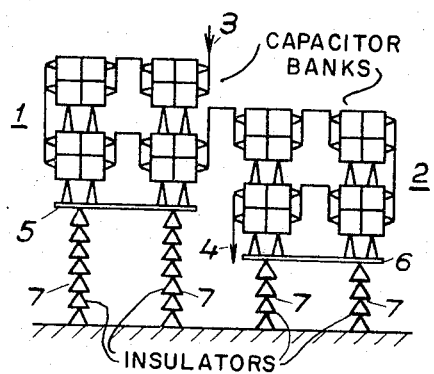

United States Patent Office 3,358,220
Patented Dec. 12, 1967

3,358,220
SUSPENDED CAPACITOR BANKS TO MINIMIZE
LEAKAGE CURRENT PATHS
Nils Fahlen, Vasteras, and Vjekoslav Madzarevic, Ludvika, Sweden, assignors to Allmänna Svenska Elektriska Aktiebolaget, Vasteras, Sweden, a corporation of Sweden
Filed Apr. 26, 1965, Ser. No. 450,775
Claims priority, application Sweden, Apr. 27, 1964, 5,172/64
3 Claims. (Cl. 323—74)

The present invention refers to a capacitor bank comprising a number of series connected capacitors and preferably a capacitor bank provided with means for resistive voltage control of the bank. The invention is therefore especially important for capacitor banks for direct current.

A capacitor bank with a small number of series connected capacitors can be built up as a single vertical column. With a large number of capacitors the bank must be built up in groups with several support points against the ground in order to obtain a sufficient mechanical stability in the construction. In such a bank however there are great many uncontrollable and undefinable leakage current paths to earth, which can be troublesome, particularly with capacitor banks with resistive voltage control. Such a voltage control consists substantially of a resistor chain parallel connected with the capacitor bank and connected to it with a number of transverse connections arranged along the bank. The leakage currents coming from different parts of the capacitor bank will all pass the control resistor and go out from different points of this resistor. Since these leakage currents can be of considerable size compared with the normal current in the control resistor, they can cause quite large voltage drops in said resistor, which voltage drops, because of the uncontrollable size and paths of the leakage currents, become quite uncontrollable, so that the predetermined voltage distribution of the control resistor becomes disturbed and in certain cases completely nullified.

This disadvantage is avoided with the present invention according to which at least a part of the series connected capacitors is connected together to form a chain suspended at its one end, so that the mechanical sequence in the chain of the capacitors is equal to the electrical sequence. By means of the suspension of the capacitors in a chain mechanical stability is also obtained for quite a large number of capacitors with only one suspension point and as the leakage current in this suspension point is parallel to the control resistor and the capacitor chain, there is no influence on the voltage distribution across the control resistor.

If the capacitor bank consists of a very great number of capacitors these can possibly be divided in two or more chains suspended parallel to each other and connected in series. In this case there will be an extra suspension point for each suspended chain with the consequent extra leakage current path, but if the two lower or the two upper end points of the series connected chains are always connected, the number of the extra leakage current paths becomes very limited, so that it thus becomes relatively easy to predetermine and control the voltage distribution across the capacitor bank.

Possibly according to another form of the invention a smaller number of capacitors would be placed on the ground, arranged in a vertical column whose upper end point is connected to the lower end point of a suspended chain of capacitors. The capacitor battery is then suitably connected to the network in such a way that the highest potential in the capacitor bank is at the suspension point of the chain, while the capacitors on the ground have the lowest potential, so that the leakage currents from the latter capacitors can be kept quite small.

Figure 2:
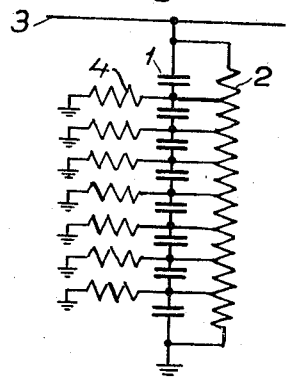
Figure 3:
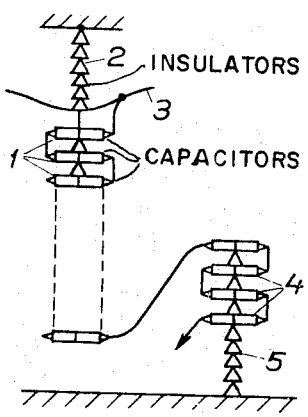
Figure 4:
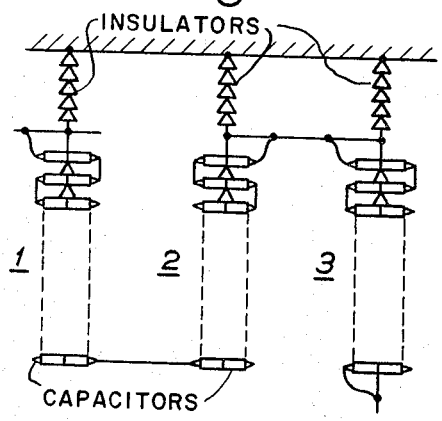

The invention will be more fully described with reference to the accompanying drawing, where FIGS. 1 and 2 show the conditions in a conventional bank arranged on the ground, while FIGS. 3 and 4 shows different embodiments according to the invention.

FIG. 1 shows a capacitor bank comprising two groups 1 and 2 of series connected capacitors, which together with their parallel resistor are enclosed in boxes and connected between two conductors 3 and 4. The two groups are placed each on their own platforms 5 and 6 respectively, which are placed on the ground on insulating columns 7, whose height is chosen depending on the potential difference between the particular capacitor group and earth. Experience has shown that, even with the best insulation of the bank, leakage currents from different points of the capacitor bank cannot be avoided and in order to illustrate the consequence of such leakage currents, reference is made to FIG. 2, which shows schematically a number of series connected capacitors 1 and a control resistor 2 parallel connected to the capacitor chain and connected to this by means of a number of transverse connections between equi-potential points in the two parallel branches. The bank can be connected between a conductor 3 and earth and further the different leakage current paths in the bank have been shown as a large number of resistors. These resistors represent the different leakage current paths for the leakage currents from the different points of the capacitor bank and as is known the size of and the relation between these leakage resistors is quite arbitrary and variable, depending on the place where the bank is and the climatic conditions and cleanliness of the air on said place, so that it is practically impossible to predetermine the character of these leakage currents. However, the leakage currents must pass the control resistor 2, so that in this they give rise to voltage drops of uncontrollable size and distribution.

During unfavourable conditions the operation of the control resistor is therefore completely spoiled.

In order to avoid this, it is proposed as mentioned according to the invention to suspend at least a number of the capacitors in a chain as shown in FIG. 3. Here is shown a chain of series connected capacitors 1 suspended by an insulating chain 2 and connected at the upper end to a conductor 3 in a network. The different capacitors 1 are here indicated as boxes, suspended in an insulating manner from each other and with built in control resistors. It can be seen that by this means only a single leakage current path for the capacitor bank will occur, namely across the insulator chain 2 and this leakage current path will not influence the voltage distribution along the capacitor chain. In FIG. 3 it has further been shown how a small number of capacitors 4 can be arranged as a vertical column placed on an insulating column 6. In this way there will it is true be an extra leakage current path, but the distribution of the leakage current will be well defined so that it is possible to control the consequences of such a leakage current. Besides, such a construction can be used when the capacitors 4 have little potential to earth, so that the leakage currents from these will be quite limited.

In FIG. 4 a capacitor bank divided into three series connected suspended insulated chains 1, 2 and 3 has been shown. Here the capacitor bank will have three suspension points in all, but because the chains 1 and 2 are connected together at their lower free-hanging end points and chains 2 and 3 are connected together at their suspension points, the capacitor bank with three capacitor chains will only have one extra leakage current path in relation to the capacitor chain according to FIG. 3, namely over the suspension insulations for 2 and 3. These indeed make two parallel paths but from the same potential point in the bank, so that they can be regarded as one path from the electrical point of view. Also in such a case it is possible to keep the disturbances from the leakage currents within narrow limits.

It is thus possible according to the invention to arrange a capacitor bank with no or only limited leakage current path from any inner point of the capacitor battery.

What is claimed is:

1. A capacitor bank for high voltage direct current comprising a plurality of series connected capacitors; a plurality of housings; said series connected capacitors being arranged in said housings; means mechanically connecting said housings together to form a chain; said chain being suspended at one end; said capacitors being electrically connected in series in the same sequence as the mechanical arrangement of their housings; control resistors included in said housings; the direct current voltage being connected to the upper end of said chain; the lower end of the chain being spaced from ground.

2. A capacitor bank as claimed in claim 1, further capacitors connected in series between the lower end of the chain and ground; said further capacitors being arranged in a vertical column arranged on the ground; the upper end of said vertical column being connected to the lower end of said capacitor bank.

3. A capacitor bank for high voltage direct current comprising a plurality of groups of capacitors; each group comprising a plurality of series connected capacitors and a plurality of housings; means mechanically connecting the housings of each group to form a chain suspended at one end; the capacitors of each group being mechanically connected in series in the same sequence as the mechanical arrangement of the housings; control resistors included in said housings; the direct current voltage being connected to the upper end of one of said groups; the lower end of each group being spaced from ground; said groups being series connected at their end points.

References Cited

UNITED STATES PATENTS

| | | | |
|---|---|---|---|
| 1,795,176 | 3/1931 | Lloyd | 317—61 X |
| 1,880,259 | 10/1932 | Knapp | 174—141 |
| 3,270,246 | 8/1966 | Lemens | 323—128 X |

JOHN F. COUCH, *Primary Examiner.*

A. D. PELLINEN, *Assistant Examiner.*